United States Patent Office 3,000,207
Patented Sept. 19, 1961

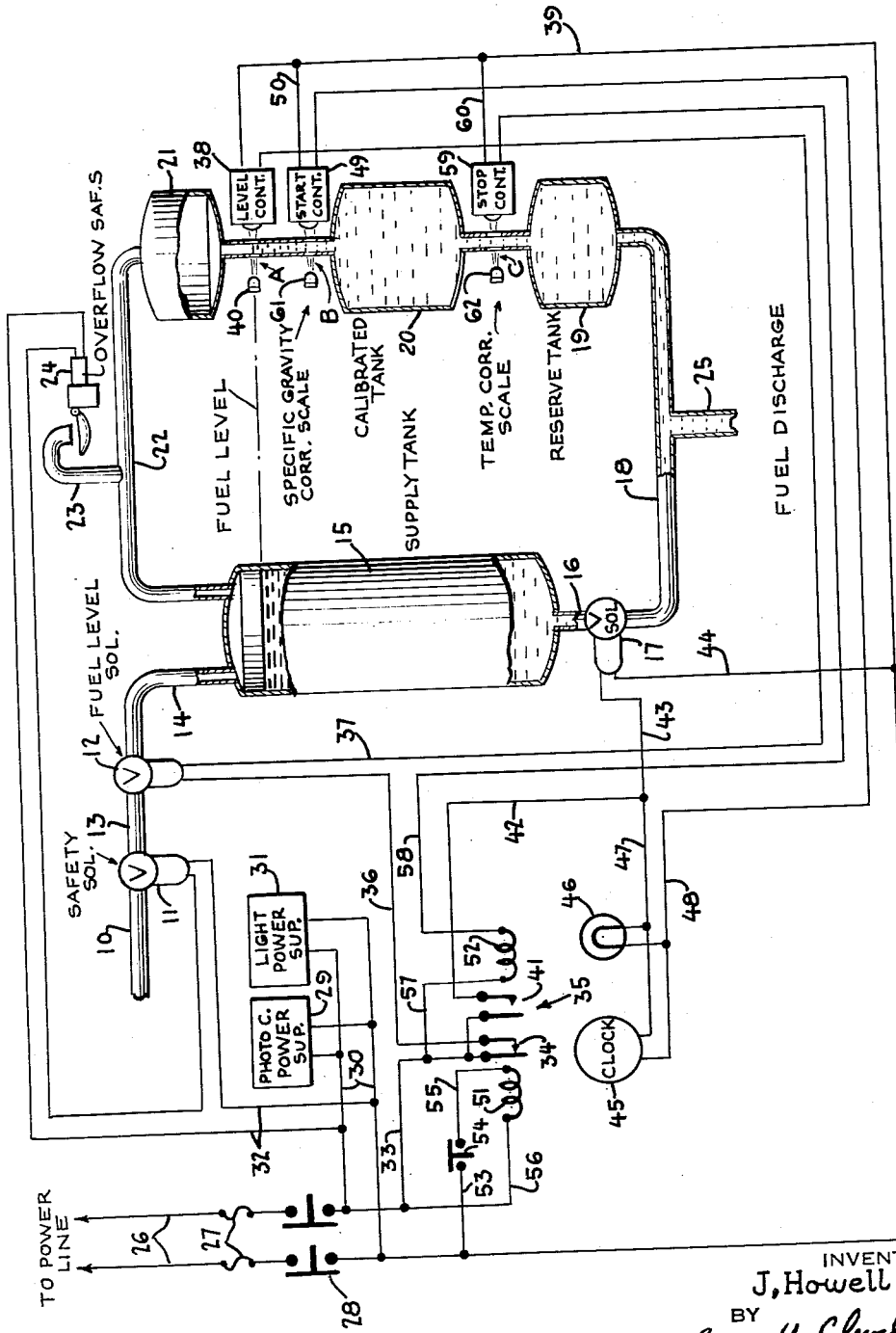

3,000,207
APPARATUS FOR DETERMINING THE RATE OF FLOW OF A LIQUID
John Howell Goffe, Clayton, N.J., assignor to Socony Mobil Oil Company, Inc., a corporation of New York
Filed Oct. 7, 1957, Ser. No. 688,707
2 Claims. (Cl. 73—113)

This invention relates to an apparatus for accurately determining the rate of flow of a measured volume of liquid through a system.

The metering device contemplated by the present invention is adapted to be either permanently or temporarily connected into a liquid flow system in such a manner that it is entirely automatic in its operation. The device is of substantially a U configuration, one arm of which is formed by the supply line and supply tank while the other arm is made up of a reserve tank, a tank of calibrated volume and an overflow tank, all connected in series. The two arms of the U structure are connected together at the bottom and feed into a fuel discharge line. Suitable electrical circuitry and control elements are provided for admitting the liquid into the measuring system, controlling the level of the liquid in the system and automatically measuring the period of time required for a measured volume of the liquid to flow from the system.

Numerous rate of flow devices exist in the prior art but none are believed to be sufficiently accurate to measure low liquid flow rates with the high degree of accuracy achievable by the instant invention. Not only is the instant invention capable of determining the rate of flow of a liquid with a high degree of accuracy, but, it can be used to automatically measure the rate of flow of a liquid in a system at any desired time and, at the end of the measuring period, will automatically restore the system to normal operation. This measurement can be made without in any way interfering with the normal flow of liquid through the system.

Therefore, the primary object of this invention is to provide an apparatus for automatically and accurately determining the rate of flow of liquid in a system. Another object is to provide apparatus which may be temporarily or permanently connected in a liquid flow system and which will automatically determine the rate of flow in the system at any time without interfering with the normal flow of liquid therefrom. This invention further contemplates electric control means whereby the time required for a calibrated volume of liquid to flow from the system can be accurately measured. Other objects and advantages of this invention will become apparent from the following detailed description when considered with the drawings in which the single figure shows the measuring device and, schematically, the electrical circuitry associated therewith.

Although the present invention finds broad application wherever it is desired to accurately determine the rate of flow of liquid in a system, it will be described in detail in connection with the flow of fuel, such as gasoline, to an internal combustion engine, not shown.

The mechanical portion of the system includes a fuel supply line 10, which is connected to a solenoid controlled safety valve 11. Valve 11 is connected to a fuel level solenoid control valve 12 by the conduit 13. Conduit 14 connects the fuel level control valve to the fuel supply tank 15. The bottom of the fuel supply tank is connected by conduit 16 to a solenoid operated test valve 17. Fuel admitted to the fuel supply tank at the top thereof may flow through the conduit 18 to a reserve supply tank 19 and from there to the tank 20 of calibrated volume. The top of tank 20 is connected to an overflow tank 21. The top of the fuel supply tank 15 and the top of the overflow tank 21 are connected by conduit 22. Conduit 22 is provided with an overflow pipe 23, the discharge from which will operate an overflow safety switch 24 to close valve 11 which cuts off the supply of fuel to the system. Conduit 18, at the bottom of the system, is provided with a fuel discharge outlet 25.

The manner of operation of the above described system can best be understood from a description of the electrical control circuitry. Power is supplied for operation of the device by the power mains 26, which may be connected to a conventional 117 volt alternating current source. The power mains are provided with conventional fuses 27 and a power switch 28, which may be termed a master switch for cutting off the power to the entire system. In some applications of the instant invention, it may be desirable to make switch 28 automatic so that it can operate as a safety switch. Since photocell operated relays are used to control the liquid level in the system and the beginning and end of the measuring period, power must be supplied to them as well as to their associated light sources. Power is supplied to the photocell operated relays by a power supply 29 of a conventional type. The power supply 29 is connected to the power mains 26 by conductors 30. Conductors 30 also supply power to a second power supply 31 which lights the filaments of the lights associated with the photocell operated relays. Conductors 32, leading from conductors 30, supply power to the solenoid operated safety valve 11 and the overflow safety switch 24, which are connected in series. Since the solenoid operated valve 11 is of the type which remains closed when the solenoid is de-energized, opening of the overflow safety switch 24 by the discharge of liquid from the pipe 23 will shut off the fuel supply to the system.

The solenoid of valve 12 is connected in a series circuit which includes one side of the power mains 26, conductor 33, points 34 of relay 35, which are normally closed, conductor 36, the solenoid of valve 12, conductor 37, the photocell operated relay 38 and conductor 39, which returns to the other side of the power mains 26. Valve 12 is of the type which, when its solenoid is de-energized, will remain closed. The operation of valve 12, when conduits 34 are closed, depends upon the photocell operated relay 38. The photocell of this unit, when the level of the fuel in the system is below the point A, receives light from the light source 40. When the light from source 40 falls on the photocell of unit 38, its relay completes a power circuit through the solenoid of valve 12 to open it and supply fuel to the system until the level in the system is again restored to the point A. At this point it intercepts the light from source 40 to cause the opening of the photocell controlled relay in unit 38. Opening of these relay points causes valve 12 to close, thereby shutting off the fuel supply to the tank 15. The solenoid operated test valve 17 is connected in a series circuit which includes one side of the power mains 26, conductor 33, points 41 of relay 35, which are normally open, conductor 42, conductor 43, the solenoid of valve 17, conductor 44 and conductor 39, which returns to the other side of the power supply mains 26. Test valve 17 is of the type which is closed when its solenoid is energized. Since contacts 41 are normally open, valve 17 will normally remain in its open position. An electric stop clock 45 and pilot light 46 are connected in parallel and the parallel combination connected in a series circuit which includes one side of the power mains 26, conductor 33, the points 41 of relay 35, conductor 42, conductor 47, conductor 48, the photocell control relay unit 49, conductor 50, and conductor 39, which returns to the other side of the power supply mains 26. Relay 35 is of the type which, when operated in one direction remains in that condition until operated in the opposite direction. This operation is made possible by providing the relay with two operating solenoids 51 and 52. Solenoid 51 is connected in a circuit which includes one side of the power mains 26, conductor 53, switch 54, conductor 55, the solenoid 51 and conductor 56, which return to the other side of the power supply mains 26. Switch 54 may be of the type which is normally biased to its open position and completes the circuit through the solenoid only when it is depressed. For operation of the instant invention, it is only necessary to depress it momentarily to deliver an electric impulse to the solenoid 51 to operate the relay in a direction which will open the points 34 and close the points 41. Relay 35 is reset by energizing solenoid 52. Solenoid 52 is in a series circuit which includes one side of the power supply mains 26, conductor 33, conductor 57, solenoid 52, conductor 58, photocell, controlled relay unit 59, the conductor 60 and conductor 39, which returns to the other side of the power supply mains 26.

When it is desired to determine the rate of flow of fuel to an internal combustion engine which is being operated thereby, it is only necessary to momentarily depress switch 54 to complete the electrical circuit through the solenoid 51 of relay 35. The impulse delivered to the solenoid 51 will open contacts 34 and close contacts 41. In so doing, the test valve 17 is caused to close shutting off fuel that is supplied from the fuel supply tank 15, thereby making it necessary for the internal combustion engine to draw its fuel from the other side of the system which contains the calibrated tank 20. However, the operation of relay 35 sets up a circuit for the stop clock 45. The clock will not be started until the level of the fuel in the right hand side of the system has fallen below the point B, at which point light from the source 61 will fall upon the photocell of the photocell operated relay unit 49 to cause this relay to complete the power circuit for the clock. The clock, thus having been started, will continue to run until the liquid level in the right hand side of the system has fallen below the point C. At this point the light from the source 62 will impinge upon the photocell of the photocell controlled relay unit 59 to actuate this relay to break the power circuit to the clock. The interval of time that the clock runs or operates is that required for the measured volume of fuel, as measured between the points B and C, to flow from the tank of calibrated volume. When the liquid in the right hand side of the system has fallen below the points C the photocell actuated relay 59 will close. When this relay has closed, it will complete a circuit through the reset coil 52 of relay 35 to connect contacts 34 and close contacts 41 of relay 35. Energizing the solenoid 52 of relay 35 actuates the contacts 34 and 41 to their other position. This restores all circuits which have been previously rendered inoperative during the measuring period. Therefore, it can be seen that at the will of the operator a test can be made at any time without interrupting the flow of fuel to the internal combustion engine.

From the foregoing, it can be seen that when it is desired to measure the rate of consumption of a fuel, it is only necessary to momentarily depress switch 54 to actuate the relay 35, thereby opening the contacts 34 and closing contacts 45. This will close the test valve 17. Further operation of the internal combustion engine will require that it be supplied with fuel from the right hand side of the system. The fuel will recede in the right hand side from the point A, which is the level control point, toward the point B. In passing the point B, clock 45 will be started. Further consumption of fuel will deplete the contents of calibrated tank 20 and the fuel level in passing point C will stop the clock to give an accurate recording of the elapsed time for the calibrated volume of fuel to be consumed and return the system to normal operation.

Since the volume of the fuel in tank 20 will vary with changes in temperature, means are provided whereby the light source 62 and its associated photocell control relay 57 can be adjusted vertically to compensate for temperature changes. Additionally, since fuels of different specific gravity are used, means are provided whereby corrections for fuels having different specific gravities can be made. This involves the light source 61 and its associated photocell controlled relay unit 49. This assemblage, as a unit, may be adjusted vertically to correct for changes in specific gravity.

Although the present invention has been described in connection with the rate of fuel consumption by an internal combustion engine, it is obvious to those skilled in the art that it finds application wherever it is desired to determine the rate of flow of a liquid through a system.

I claim:

1. A device for measuring the rate of flow of a liquid through a system comprising: a supply tank and a calibrated tank having an upward extension, said tanks having a flow tube connecting them at their bottoms, liquid supply means for the supply tank, a discharge tube leading from the flow tube, means acting to maintain a common liquid level in the supply tank and the upward extension of the calibrated tank when they are in communication through said flow tube, means to isolate the supply tank from said flow tube, and means to measure the time required for discharge of said calibrated tank while the supply tank is so isolated.

2. A device for measuring the rate of flow of a liquid through a system comprising: a supply tank and a calibrated tank having an upward extension, said tanks having a flow tube connecting them at their bottoms, liquid supply means for the supply tank, a discharge tube leading from the flow tube, means acting to maintain a common liquid level in the supply tank and the upward extension of the calibrated tank when they are in communication through said flow tube, means to isolate the supply tank from said flow tube, means to measure the time required for discharge of said calibrated tank while the supply tank is so isolated, and means to open said isolating means at the end of discharge from the calibrated tank.

References Cited in the file of this patent

UNITED STATES PATENTS

| | | |
|---|---|---|
| 1,567,821 | Sweetland | Dec. 29, 1925 |
| 2,118,079 | Goode et al. | May 24, 1938 |
| 2,215,680 | Wiley et al. | Sept. 24, 1940 |
| 2,325,695 | McAfee | Aug. 3, 1943 |
| 2,490,627 | Hofberg | Dec. 6, 1949 |
| 2,505,905 | McAfee | May 2, 1950 |
| 2,631,437 | Bruce et al. | Mar. 17, 1953 |
| 2,697,939 | Martin et al. | Dec. 28, 1954 |